US012570499B2

(12) United States Patent
Kattainen et al.

(10) Patent No.: US 12,570,499 B2
(45) Date of Patent: Mar. 10, 2026

(54) ELEVATOR COMMUNICATION SYSTEM

(71) Applicant: Kone Corporation, Helsinki (FI)

(72) Inventors: Ari Kattainen, Helsinki (FI);
Juha-Matti Aitamurto, Helsinki (FI);
Gergely Huszak, Helsinki (FI)

(73) Assignee: Kone Corporation, Helsinki (FI)

( * ) Notice: Subject to any disclaimer, the term of this patent is extended or adjusted under 35 U.S.C. 154(b) by 1340 days.

(21) Appl. No.: 17/231,610

(22) Filed: Apr. 15, 2021

(65) Prior Publication Data

US 2021/0339978 A1 Nov. 4, 2021

(30) Foreign Application Priority Data

Apr. 30, 2020 (EP) ..................................... 20172438

(51) Int. Cl.
| | |
|---|---|
| *B66B 1/34* | (2006.01) |
| *B66B 1/24* | (2006.01) |
| *B66B 5/00* | (2006.01) |
| *H04L 12/403* | (2006.01) |
| *H04L 67/12* | (2022.01) |

(52) U.S. Cl.
CPC .......... *B66B 1/3461* (2013.01); *B66B 1/2408* (2013.01); *B66B 5/0031* (2013.01); *H04L 12/403* (2013.01); *H04L 67/12* (2013.01)

(58) Field of Classification Search
CPC ... B66B 1/3461; B66B 1/2408; B66B 5/0031; B66B 1/3446; H04L 12/40182; H04L 12/40195; H04L 2012/445; H04L 12/44; H04L 12/403; H04L 67/12; H04B 3/60
See application file for complete search history.

(56) References Cited

U.S. PATENT DOCUMENTS

| | | | | |
|---|---|---|---|---|
| 11,770,324 B1* | 9/2023 | Hayes | .................... | H04L 47/34 |
| | | | | 709/223 |
| 2011/0106276 A1* | 5/2011 | Donnell | .............. | H01R 9/2408 |
| | | | | 700/19 |
| 2013/0279417 A1* | 10/2013 | Binder | ................. | H04B 7/2606 |
| | | | | 370/328 |
| 2017/0097259 A1* | 4/2017 | Brown | .................. | G01J 1/0271 |
| 2022/0350773 A1* | 11/2022 | Ryan | ......................... | G06F 1/14 |

FOREIGN PATENT DOCUMENTS

| | | | | | |
|---|---|---|---|---|---|
| WO | WO-02056540 A2 | * | 7/2002 | .......... | H04L 12/282 |
| WO | WO-2009132697 A1 | * | 11/2009 | .............. | B66B 1/34 |
| WO | WO-2018134205 A1 | * | 7/2018 | ............ | H04L 67/12 |
| WO | WO-2018202736 A1 | * | 11/2018 | .......... | B66B 1/3423 |
| WO | WO-2020162084 A1 | * | 8/2020 | ......... | H04L 12/2803 |

OTHER PUBLICATIONS

Translation of WO2018202736 (Year: 2018).*
Extended European Search Report for European Patent Application No. 20172438.2 dated Oct. 19, 2020.

* cited by examiner

*Primary Examiner* — Uzma Alam
(74) *Attorney, Agent, or Firm* — Harness, Dickey & Pierce, P.L.C.

(57) ABSTRACT

According to an aspect, there is provided an elevator communication system. The system comprises an elevator controller, a multi-drop ethernet bus segment reachable by the elevator controller, and a plurality of elevator system nodes connected to the at least one multi-drop ethernet bus segment configured to communicate via the multi-drop ethernet bus, wherein the elevator controller is reachable by the elevator system nodes via the multi-drop ethernet bus segment.

26 Claims, 7 Drawing Sheets

ELEVATOR COMMUNICATION SYSTEM

RELATED APPLICATIONS

This application claims priority to European Patent Application No. 20172438.2 filed on Apr. 30, 2020, the entire contents of which are incorporated herein by reference.

TECHNICAL FIELD

The present application relates to the field of elevator communication systems.

BACKGROUND

In modern elevator system, more and more data is sent and received by different entities of an elevator system. For example, an elevator controller may receive information from call buttons and then control an elevator drive to serve calls, or the elevator controller may receive information from a safety circuit and then based on this information control one or more entities of the elevator system. These are only some possible examples of situations where information is received and/or sent within an elevator system.

It is characteristic for the modern elevator systems that an elevator system may comprise multiple different internal data transmission solutions. This may mean that multiple different communication stacks and multiple different physical layers may be used simultaneously. The use of multiple different internal data transmission solutions may result in a complicated and inefficient solution.

Thus, it would be beneficial to have a solution that would alleviate at least one of these drawbacks.

SUMMARY

According to a first aspect, there is provided an elevator communication system comprising an elevator controller, at least one multi-drop Ethernet bus segment reachable by the elevator controller, and a plurality of elevator system nodes connected to the at least one multi-drop Ethernet bus segment and configured to communicate via the at least one multi-drop Ethernet bus segment, wherein the elevator controller is reachable by the elevator system nodes via the at least one multi-drop Ethernet bus segment. Preferably, a plurality of elevator system nodes are coupled to a same bus segment of said multi-drop Ethernet bus such that only one bus node is to be active at a time while other bus nodes of the same segment are in high-impedance state.

In an implementation form of the first aspect, further comprising at least one point-to-point Ethernet bus and at least one connecting unit, wherein the at least one connecting unit comprises a first port connected to a multi-drop Ethernet bus of the at least one multi-drop Ethernet bus segment and a second port connected to a point-to-point Ethernet bus of the at least one point-to-point Ethernet bus.

In an implementation form of the first aspect, the at least one point-to-point-Ethernet bus comprises a first point-to-point-Ethernet bus towards an elevator car and the at least one multi-drop Ethernet bus segment comprises an elevator car segment, wherein a connecting unit disposed in the elevator car comprises a first port connected to the elevator car segment and a second port connected to the point-to-point Ethernet bus. According to an example embodiment, the point-to-point-Ethernet bus is located in the travelling cable of the elevator car.

In an implementation form of the first aspect, the at least one point-to-point-Ethernet bus comprises a second point-to-point-Ethernet bus, and the at least one multi-drop Ethernet bus segment comprises at least one shaft segment, each shaft segment comprising at least one shaft node, wherein a connecting unit associated with a shaft segment comprises a first port connected to the shaft segment and a second port connected to the second point-to-point Ethernet bus.

In an implementation form of the first aspect, the at least one multi-drop Ethernet bus segment comprises multiple chained multi-drop Ethernet bus segments forming shaft segments comprising at least one shaft node, so that a communication unit interconnects two consecutive shaft segments to extend the reach of the shaft segments.

In an implementation form of the first aspect, the at least one multi-drop Ethernet bus segment comprises a multi-drop Ethernet bus segment forming a landing segment connected to a shaft node, wherein the shaft node interconnects a multi-drop Ethernet bus segment to which the shaft node is connected to the landing segment.

In an implementation form of the first aspect, the at least one multi-drop Ethernet bus segment comprises a multi-drop Ethernet bus segment forming a shaft segment comprising at least one shaft node configured to communicate via the shaft segment, wherein the at least one multi-drop Ethernet bus segment comprises a respective landing segment connected to each of the at least one shaft node, respectively, wherein a shaft node interconnects a landing segment to which the shaft node is connected to the shaft segment.

In an implementation form of the first aspect, the elevator communication system comprises point-to-point Ethernet bus reachable via a first port associated with the elevator controller and a multi-drop Ethernet bus segment of the at least one multi-drop Ethernet bus segment is reachable via a second port associated with the elevator controller.

In an implementation form of the first aspect, at least one multi-drop Ethernet bus segment of the at least one multi-drop Ethernet bus segment is configured to cover a separate functional segment of the elevator system.

In an implementation form of the first aspect, the separate functional segment comprises one of a machinery area segment, a machine room segment, a shaft segment, a landing segment, a pit segment and a car segment.

In an implementation form of the first aspect, the elevator communication system further comprises an elevator safety controller connected to the point-to-point Ethernet bus, the elevator safety controller being reachable by the at least one multi-drop Ethernet bus segment.

In an implementation form of the first aspect, the elevator communication system further comprises an elevator group controller connected to the elevator controller.

In an implementation form of the first aspect, the elevator communication system further comprises a network analyzer configured to analyze bus traffic, the network analyzer being communicatively connected to the elevator controller.

In an implementation form of the first aspect, the elevator communication system further comprises a network interface unit communicatively connected to the elevator controller, the network interface unit enabling a connection to an external communication network.

In an implementation form of the first aspect, each of the elevator system nodes is configured to interface at least one of: an elevator fixture, an elevator sensor, an elevator safety device, and an elevator control device.

In an implementation form of the first aspect, at least one shaft node is duplicated.

In an implementation form of the first aspect, the at least one duplicated shaft node is connected to another location of the landing segment than the shaft node.

In an implementation form of the first aspect, a shaft segment is duplicated, and the duplicated shaft node is connected to the duplicated shaft segment.

In an implementation form of the first aspect, in some of the multi-drop bus segments data frames may contain safety relevant information. In some of the multi-drop bus segments the data frames may contain non-safety relevant information. In some of the multi-drop bus segments the data frames may contain both safety relevant and non-safety relevant information.

According to a second aspect, there is provided a method for introducing a new elevator system component to an elevator control system comprising an Ethernet bus. The method comprises connecting an elevator system bus node to a multi-drop Ethernet bus segment associated with the Ethernet bus; connecting the new elevator system component to the bus node; communicating, by the bus node, operational characteristics and a network address of the new elevator system component to a configuration controller via the Ethernet bus; and generating, by the configuration controller, configuration data based on the operational characteristics and the physical address of the new elevator system component.

In an implementation form of the second aspect, the method further comprises configuring at least one of elevator controller software and the new elevator system component based on the configuration data.

In an implementation form of the second aspect, the configuration controller is a remote server or a cloud computing entity.

In an implementation form of the second aspect, the configuration controller is an elevator controller.

In an implementation form of the second aspect, the new bus node is configured to communicate with the configuration controller using the Ethernet protocol.

In an implementation form of the second aspect, the new elevator system component comprises one of a display, a destination call panel, a car call button, a safety contact, a voice intercom system, and a camera.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates an elevator communication system that comprises an elevator controller, at least one multi-drop Ethernet bus segment reachable by the elevator controller; and a plurality of elevator system nodes connected to the at least one multi-drop Ethernet bus segment and configured to communicate via the at least one multi-drop Ethernet bus segment, wherein the elevator controller is reachable by the elevator system nodes via the at least one multi-drop Ethernet bus segment. The illustrated solution may enable, for example, classifying different functional parts of the elevator communication system into separate multi-drop Ethernet bus segments. The illustrated solution may also enable, for example, a simple and efficient solution for adding new elevator system nodes to the elevator communication system.

In an example embodiment, the various embodiments discussed below may be used in an elevator system comprising an elevator that is suitable and may be used for transferring passengers between landing floors of a building in response to service requests. In another example embodiment, the various embodiments discussed below may be used in an elevator system comprising an elevator that is suitable and may be used for automated transferring of passengers between landings in response to service requests.

Figure 1A:
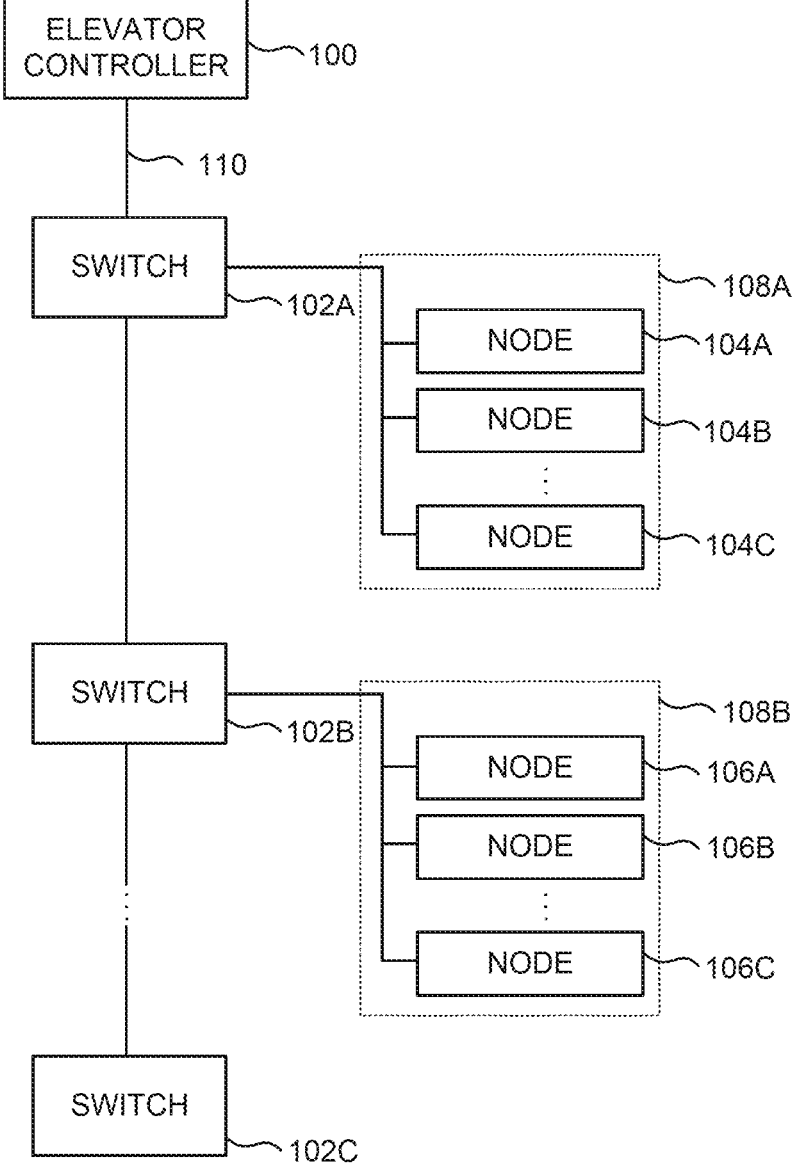
FIG. 1A illustrates an elevator communication system according to an example embodiment.

FIG. 1A illustrates an elevator communication system according to an example embodiment. The elevator communication system comprises an elevator controller 100. The elevator communication system may further comprise one or more multi-drop Ethernet bus segments 108A, 108B (for example, in the form of 10BASE-T1S) reachable by the elevator controller 100, and a plurality of elevator system nodes 104A, 104B, 104C, 106A, 106B, 106C coupled to the multi-drop Ethernet bus segments 108A, 108B and configured to communicate via the multi-drop Ethernet bus 108A, 108B. The elevator controller 100 is reachable by the elevator system nodes 104A, 104B, 104C, 106A, 106B, 106C via the multi-drop Ethernet bus segments 108A, 108B. Elevator system nodes that are coupled to the same multi-drop Ethernet bus segment may be configured so that one elevator system node is to be active at a time while the other elevator system nodes of the same multi-drop Ethernet bus segment are in a high-impedance state.

In an example embodiment, the elevator communication system may comprise a point-to-point Ethernet bus 110 and at least one connecting unit 102A, 102B, 102C comprising a first port connected to the respective multi-drop Ethernet bus segments 108A, 108B and a second port connected to the point-to-point Ethernet bus 110. Thus, by using the connecting units 102A, 102B, 102C, one or more multi-drop Ethernet bus segments 108A, 108B may be connected to the point-to-point Ethernet bus 110. The connecting unit 102A, 102B, 102C may refer, for example, to a switch. Further, the point-to-point Ethernet bus 110 may be connected to the elevator controller 100. The point-to-point Ethernet bus 110 may be, for example, 100BASE-TX or 10BASET1L pointto-point Ethernet bus. The multi-drop Ethernet bus segment 108A, 108B may comprise, for example, 10BASE-T1S multi-drop Ethernet bus.

In an example embodiment, an elevator system node 104A, 104B, 104C, 106A, 106B, 106C may be configured to interface with at least one of an elevator fixture, an elevator sensor, an elevator safety device, and an elevator control device. Further, in an example embodiment, power to the nodes may be provided with the same cabling. In another example embodiment, the elevator system nodes 104A, 104B, 104C, 106A, 106B, 106C may comprise shaft nodes, and a plurality of shaft node may form a shaft segment, for example, the multi-drop Ethernet bus segment 108A, 108B.

Figure 1B:
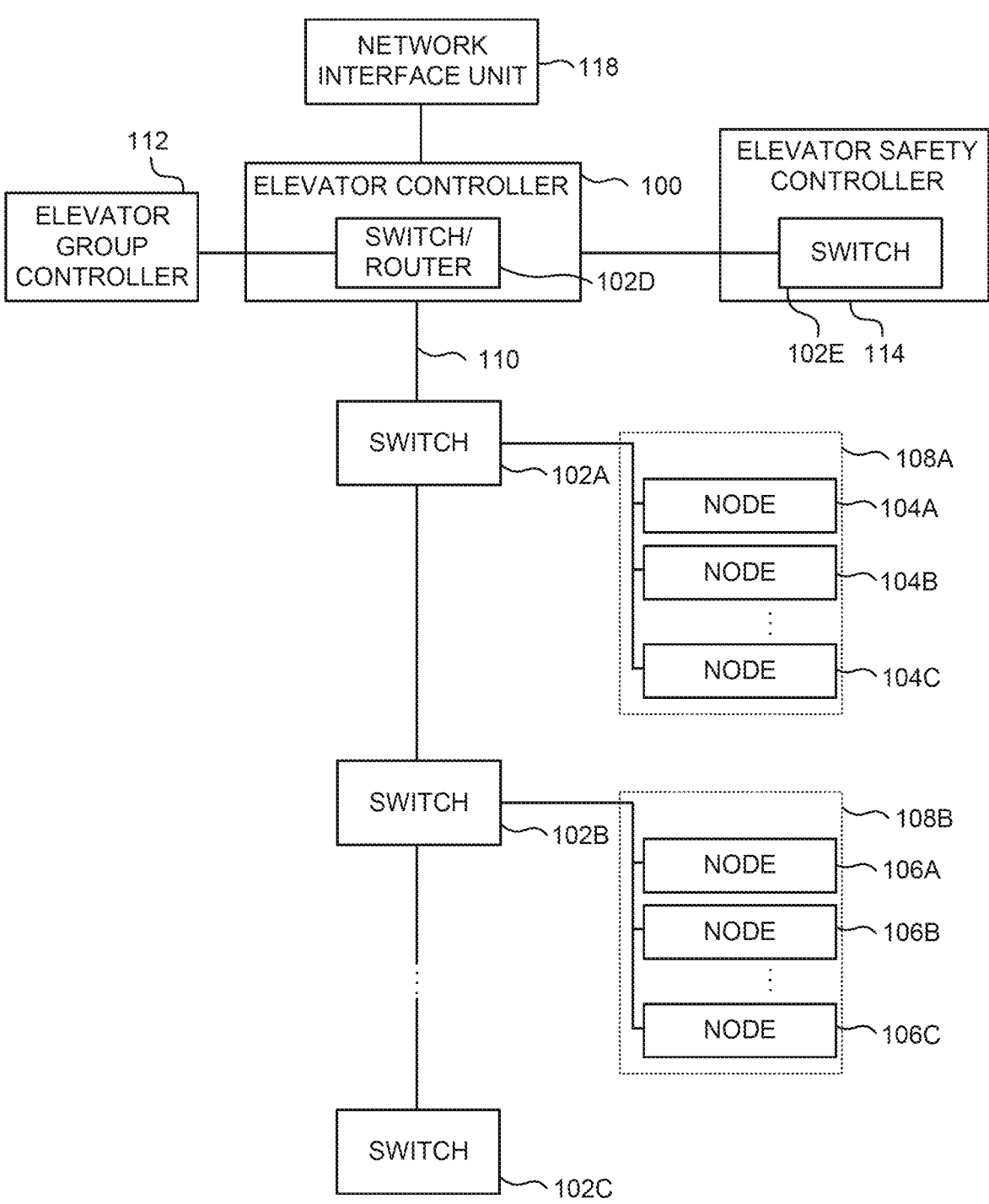
FIG. 1B illustrates an elevator communication system according to another example embodiment.

FIG. 1B illustrates an elevator communication system according to another example embodiment. The elevator communication system comprises an elevator controller 100. The elevator communication system may further comprise one or more multi-drop Ethernet bus segments 108A, 108B reachable by the elevator controller 100, and a plurality of elevator system nodes 104A, 104B, 104C, 106A, 106B, 106C configured to communicate via the multi-drop Ethernet bus segments 108A, 108B, wherein the elevator controller 100 is reachable by the elevator system nodes 104A, 104B, 104C via the multi-drop Ethernet bus segments 108A, 108B. The elevator communication system may also comprise an elevator group controller 112 connected to the elevator controller 100. The elevator controller 100 may comprise a switch or a router 102D, which connects the elevator controller 100 to an internal Ethernet network of the elevator communication system.

In an example embodiment, the elevator communication system may comprise a point-to-point Ethernet bus 110 and at least one connecting unit 102A, 102B, 102C comprising a first port connected to the respective multi-drop Ethernet bus segment 108A, 108B and a second port connected to the point-to-point Ethernet bus 110. Thus, by using the connecting units 102A, 102B, 102C, one or more multi-drop Ethernet bus segments 108A, 108B may be connected to the point-to-point Ethernet bus 110. The connecting unit 102A, 102B, 102C may refer, for example, to a switch, a hub or a router. Further, the point-to-point Ethernet bus 110 may be connected to the elevator controller 100. The point-to-point Ethernet bus 110 may be, for example, 100BASE-TX or 10BASET1L point-to-point Ethernet bus. The multi-drop Ethernet bus segment 108A, 108B may comprise, for example, 10BASE-T1S multi-drop Ethernet bus.

In an example embodiment, an elevator system node 104A, 104B, 104C, 106A, 106B, 106C may be configured to interface with at least one of an elevator fixture, an elevator sensor, an elevator safety device, and an elevator control device. Further, in an example embodiment, power to the nodes may be provided with the same cabling. In another example embodiment, the elevator system nodes 104A, 104B, 104C, 106A, 106B, 106C may comprise shaft nodes, and a plurality of shaft node may form a shaft segment, for example, the multi-drop Ethernet bus segment 108A, 108B.

The elevator communication system may comprise an elevator safety controller 114. The elevator safety controller 114 may be connected to the point-to-point Ethernet bus 110 via a connecting unit 102E. This means that the elevator system nodes 104A, 104B, 104C, 106A, 106B, 106C may send information to the elevator safety controller 114 and vice versa via the common point-to-point Ethernet bus 110. For example, the elevator system nodes 104A, 104B, 104C, 106A, 106B, 106C may send information from sensors or fixtures to the elevator controller 100 or the elevator safety controller 114 and receive information therefrom to control, for example, actuators configure fixtures etc. At least some of the elevator system nodes 104A, 104B, 104C, 106A, 106B, 106C may be safety nodes in accordance with IEC61508 SIL level 3, having a safety processing unit and a separate communication controller. Data of the safety processing unit may be sent only to the elevator safety controller 114. The safety nodes may be configured to interface with elevator safety devices, such as safety sensors or safety contacts indicating elevator safety, e.g. landing door contacts, door lock contacts, contact of overspeed governor, buffer contacts etc. The safety nodes may be configured to communicate with the elevator safety controller 114. To establish safe communication, different kind of data checks, such as checksums, error detection and/or correction algorithms etc. may be used in the communication.

Figure 1C:
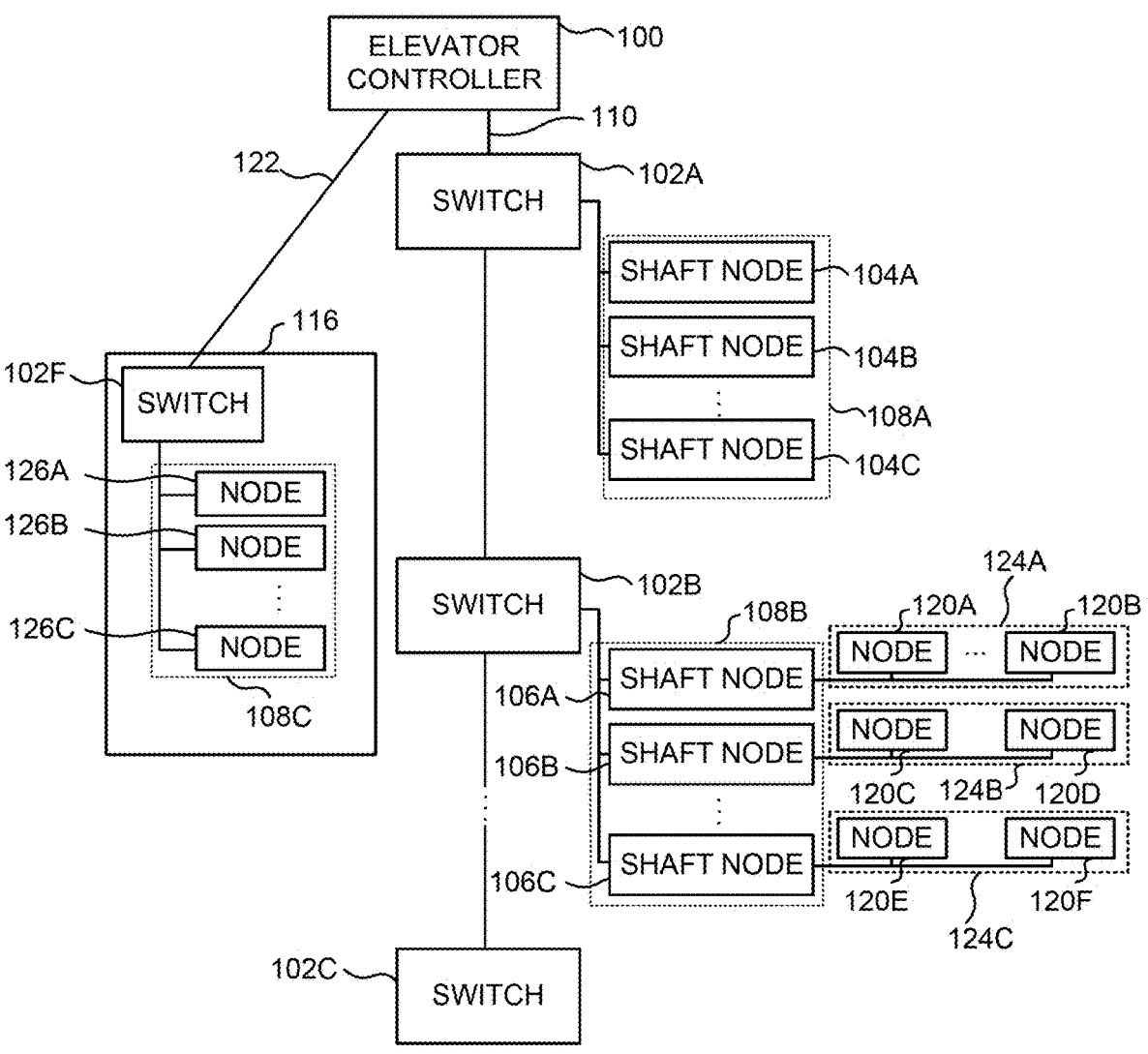
FIG. 1C illustrates an elevator communication system according to another example embodiment.

FIG. 1C illustrates an elevator communication system according to another example embodiment. The elevator communication system comprises an elevator controller 100. The elevator communication system may further comprise one or more multi-drop Ethernet bus segments 108A, 108B, 108C, 124A, 124B, 124C reachable by the elevator controller 100, and a plurality of elevator system nodes 104A, 104B, 104C, 106A, 106B, 106C, 120A-120F, 124A, 124B, 124C, 126A, 126B, 126C configured to communicate via the multi-drop Ethernet bus segments 108A, 108B, 108C, 124A, 124B, 124C, wherein the elevator controller 100 is reachable by the elevator system nodes 104A, 104B, 104C, 106A, 106B, 106C, 120A, 120F, 124A, 124B, 124C, 126A, 126B, 126C via the multi-drop Ethernet bus segments 108A, 108B, 108C, 124A, 124B, 124C.

In an example embodiment, the elevator communication system may comprise a point-to-point Ethernet bus 110 and at least one connecting unit 102A, 102B comprising a first port connected to the multi-drop Ethernet bus segment 108A, 108B and a second port connected to the point-to-point Ethernet bus 110. Thus, by using the connecting units 102A, 102B one or more multi-drop Ethernet bus segments 108A, 108B may be connected to the point-to-point Ethernet bus 110. The connecting unit 102A, 102B may refer, for example, to a switch, a hub or a router. Further, the point-to-point Ethernet bus 110 may be connected to the elevator controller 100. The point-to-point Ethernet bus 110 may be, for example, 100BASE-TX or 10BASET1L point-to-point Ethernet bus. The multi-drop Ethernet bus segments 108A, 108B may comprise, for example, 10BASE-T1S multi-drop Ethernet bus.

In an example embodiment, an elevator system node 120A-120F, 126A, 126B, 126C is configured to interface with at least one of an elevator fixture, an elevator sensor, an elevator safety device, and an elevator control device. Further, in an example embodiment, power to the nodes may be provided with the same cabling.

The elevator communication system may comprise an elevator safety controller 114. The elevator safety controller 114 may be connected to the point-to-point Ethernet bus 110 via a connecting unit 102E. This means that the elevator system nodes 104A, 104B, 104C, 106A, 106B, 106C, 120A-120F, 126A, 126B, 126C may send information to the elevator safety controller 114 and vice versa via the common point-to-point Ethernet bus 110. For example, the elevator system nodes 104A, 104B, 104C, 106A, 106B, 106C, 120A-120F, 126A, 126B, 126C may send information, for example, from sensors or fixtures to the elevator controller 100 or the elevator safety controller 114 and receive information therefrom to control, for example, actuators configure fixtures etc. At least some of the elevator system nodes 104A, 104B, 104C, 106A, 106B, 106C, 120A-120F, 126A, 126B, 126C may be safety nodes in accordance with IEC61508 SIL level 3, having a safety processing unit and a separate communication controller. Data of the safety processing unit may be sent only to the elevator safety controller 114. The safety nodes may be configured to interface with elevator safety devices, such as safety sensors or safety contacts indicating elevator safety, e.g. landing door contacts, door lock contacts, contact of overspeed governor, buffer contacts etc. The safety nodes may be configured to communicate with the elevator safety controller 114. To establish safe communication, different kind of data checks, such as checksums, error detection and/or correction algorithms etc. may be used in the communication.

The elevator communication system may further comprise an elevator drive connected to the elevator controller 100. Further, the elevator communication system may comprise a network interface unit 118 communicatively connected to the elevator controller 100, the network interface unit 118 enabling a connection to an external communication network. The network interface unit 118 may comprise, for example, a router or a gateway.

The elevator communication system may further comprise a point-to-point Ethernet bus 122 that provides a connection to an elevator car 116 and to various elements associated with the elevator car 116. The elevator car 116 may comprise a connecting unit 102F, for example, a switch, to which one or more elevator car nodes 126A, 126B, 126C may be connected. In an example embodiment, the elevator car nodes 126A, 126B, 126C can be connected to the connecting unit 102F via a multi-drop Ethernet bus segment 108C, thus constituting an elevator car segment. In an example embodiment, the point-to-point-Ethernet bus 122 is located in the travelling cable of the elevator car 116.

By implementing communication within the elevator communication system using at least one point-to-point Ethernet bus and at least one multi-drop Ethernet bus segment, various segments can be formed within the elevator communication system. For example, the elevator system nodes 120A, 120B may form a first landing segment, the elevator system nodes 120C, 120D may form a second landing segment, the elevator system nodes 120D, 120F may form a third landing segment, the shaft nodes 104A, 104B, 104C may form a first shaft segment, the shaft nodes 106A, 106B, 106C may form a second shaft segment, the elevator car nodes 126A, 126B, 126C may form an elevator car segment 108C, and the elevator drive may form a machinery segment. Each of the segments 108A, 108B, 108C implemented using separate multi-drop Ethernet buses.

As illustrated in FIG. 1C, the shaft nodes 106A, 106B, 106C interconnect the shaft segment 108B to which the shaft nodes 106A, 106B, 106C are connected to and the landing segments 124A, 124B, 124C. In other words, the shaft nodes 106A, 106B, 106C may comprise or may act as a switch to the landing segments 124A, 124B, 124C. This may enable a simple solution for adding new elevator system nodes to the elevator communication system. This may also enable a solution in which a single elevator system node may act as a switch or a repeater to another multi-drop Ethernet bus segment to which nearby elevator system elements, for example, a call button or buttons, a display or displays, a destination operating panel or panels, a camera or cameras, a voice intercom device etc.

The elevator communication system may further comprise a network analyzer configured to analyze bus traffic, the network analyzer being communicatively connected to the elevator controller.

Figure 1D:
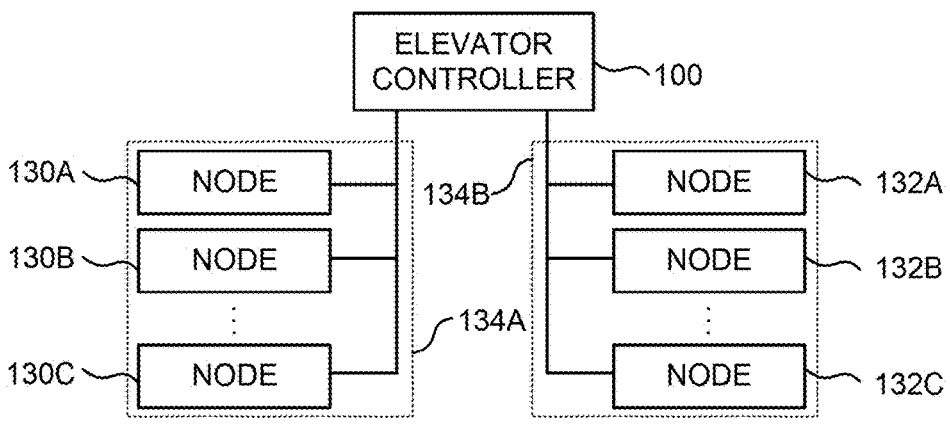
FIG. 1D illustrates an elevator communication system according to another example embodiment.

FIG. 1D illustrates an elevator communication system according to another example embodiment.

The elevator communication system comprises an elevator controller 100. The elevator communication system may further comprise a first multi-drop Ethernet bus segment 134A (for example, in the form of 10BASE-T1S) reachable by the elevator controller 100, and a second multi-drop Ethernet bus segment 134B (for example, in the form of 10BASE-T1S) reachable by the elevator controller 100. A first set of elevator system nodes 130A, 130B, 130C may be configured to communicate via the first multi-drop Ethernet bus segment 134A and a second set of elevator system nodes 132A, 132B, 132C may be configured to communicate via the second multi-drop Ethernet bus segment 134B. The first multi-drop Ethernet bus segment 134A may be reachable via a first port associated with the elevator controller 100 and the second multi-drop Ethernet bus segment 134B may be reachable via a second port associated with the elevator controller 100. Elevator system nodes that are coupled to the same multi-drop Ethernet bus segment may be configured so that one elevator system node is to be active at a time while the other elevator system nodes of the same multi-drop Ethernet bus segment are in a high-impedance state.

In an example embodiment, an elevator system node 130A, 130B, 130C, 132A, 132B, 132C may be configured to interface with at least one of an elevator fixture, an elevator sensor, an elevator safety device, and an elevator control device. Further, in an example embodiment, power to the nodes may be provided with the same cabling.

In an example embodiment, the first multi-drop Ethernet bus segment 134A may be a car segment and the second multi-drop Ethernet segment 134B may be a shaft segment. In other example embodiments, each multi-drop Ethernet bus segment may be configured to cover a separate functional segment of the elevator system, and the separate functional segment may comprise, for example, one of a machinery segment, a shaft segment, a landing segment, and a car segment. Further, even though FIG. 1D illustrates only two multi-drop Ethernet segments 134A, 134B reachable by the elevator controller 100, in other embodiments, there may be more than two multi-drop Ethernet bus segments in the elevator communication system.

Figure 1E:
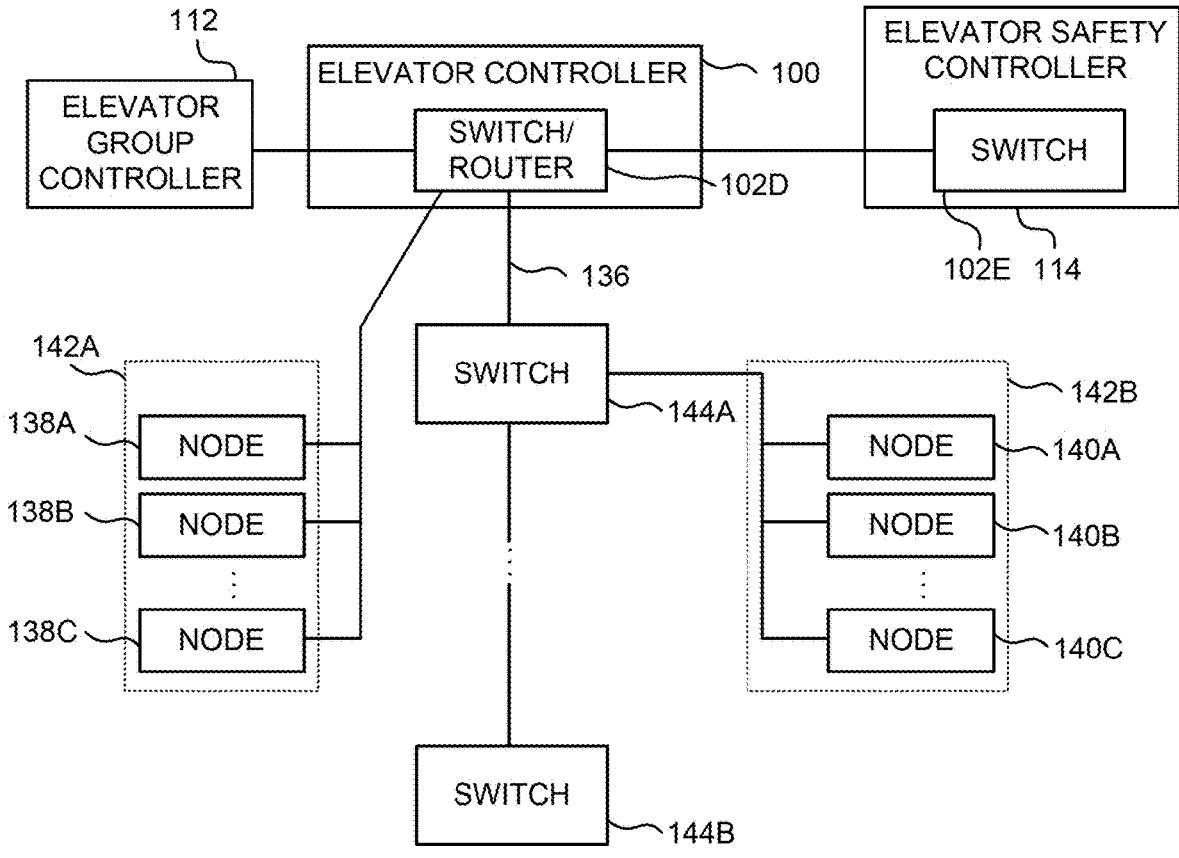
FIG. 1E illustrates an elevator communication system according to another example embodiment.

FIG. 1E illustrates an elevator communication system according to another example embodiment. The elevator communication system comprises an elevator controller 100. The elevator communication system may further comprise one or more multi-drop Ethernet bus segments 142A, 142B reachable by the elevator controller 100, and a plurality of elevator system nodes 138A, 138B, 138C, 140A, 140B, 140C configured to communicate via the multi-drop Ethernet bus segments 142A, 142B, wherein the elevator controller 100 is reachable by the elevator system nodes 138A, 138B, 138C, 140A, 140B, 140C via the multi-drop Ethernet bus segments 142A, 142B. The elevator communication system may also comprise an elevator group controller 112 connected to the elevator controller 100. The elevator controller 100 may comprise a switch or a router 102D, which connects the elevator controller 100 to an internal Ethernet network of the elevator communication system.

In an example embodiment, the elevator communication system may comprise a point-to-point Ethernet bus 136 and at least one connecting unit 144A, 144B comprising a first port connected to the multi-drop Ethernet bus segment 142B and a second port connected to the point-to-point Ethernet bus 110. Thus, by using the connecting units 144A, 144B, one or more multi-drop Ethernet bus segments 142B may be connected to the point-to-point Ethernet bus 110. The connecting unit 144A, 144B may refer, for example, to a switch, a hub or a router. Further, the point-to-point Ethernet bus 136 may be connected to the elevator controller 100. The point-to-point Ethernet bus 136 may be, for example, 100BASE-TX or 10BASET1L point-to-point Ethernet bus. The multi-drop Ethernet bus segment 142A, 142B may comprise, for example, 10BASE-T1S multi-drop Ethernet bus.

One or more multi-drop Ethernet bus segments may be connected directly to the elevator controller 100. FIG. 1E illustrates an example in which only one multi-drop Ethernet bus segment 142B is connected to the elevator controller 100 via the switch 144A.

In an example embodiment, the elevator system nodes 138A, 138B, 138C, 140A, 140B, 140C may be configured to interface with at least one of an elevator fixture, an elevator sensor, an elevator safety device, and an elevator control device. Further, in an example embodiment, power to the nodes may be provided with the same cabling. In another example embodiment, the elevator system nodes 140A, 140B, 140C may be shaft nodes, and they may form a shaft segment 142B.

The elevator communication system may comprise an elevator safety controller 114. The elevator safety controller 114 may be connected to the point-to-point Ethernet bus 136 and to the multi-drop Ethernet bus segment 142A via a connecting unit 102E. This means that the elevator system nodes the elevator system nodes 138A, 138B, 138C, 140A, 140B, 140C may send information to the elevator safety controller 114 and vice versa via the common point-to-point Ethernet bus 136 and the multi-drop Ethernet bus segment 142A. For example, the elevator system nodes 138A, 138B, 138C, 140A, 140B, 140C may send information from sensors or fixtures to the elevator controller 100 or the elevator safety controller 114 and receive information therefrom to control, for example, actuators configure fixtures etc. At least some of the elevator system nodes 138A, 138B, 138C, 140A, 140B, 140C may be safety nodes in accordance with IEC61508 SIL level 3, having a safety processing unit and a separate communication controller. Data of the safety processing unit may be sent only to the elevator safety controller 114. The safety nodes may be configured to interface with elevator safety devices, such as safety sensors or safety contacts indicating elevator safety, e.g. landing door contacts, door lock contacts, contact of overspeed governor, buffer contacts etc. The safety nodes may be configured to communicate with the elevator safety controller 114. To establish safe communication, different kind of data checks, such as checksums, error detection and/or correction algorithms etc. may be used in the communication.

Figure 1F:
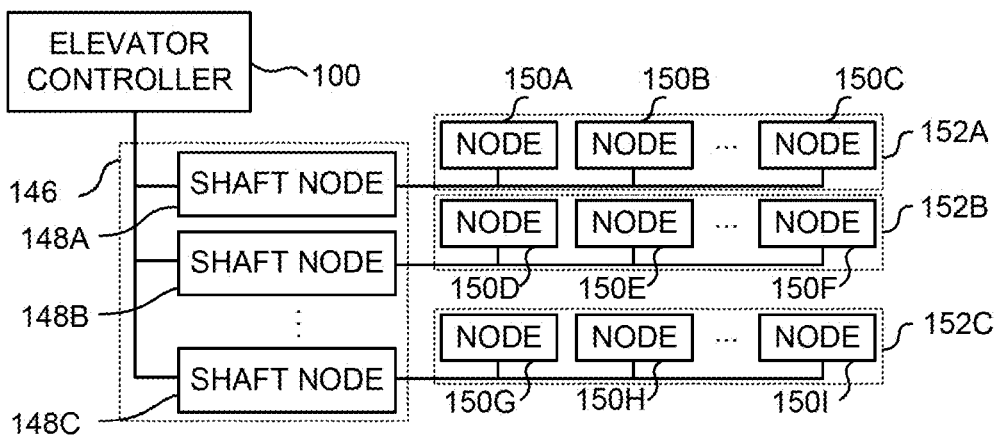
FIG. 1F illustrates an elevator communication system according to another example embodiment.

FIG. 1F illustrates an elevator communication system according to another example embodiment. The elevator communication system comprises an elevator controller 100. The elevator communication system may further comprise a multi-drop Ethernet bus segment 146A (for example, in the form of 10BASE-T1S) forming a shaft segment reachable by the elevator controller 100. The shaft segment 146 comprises shaft nodes 148A, 148B, 148C configured to communicate via the multi-drop Ethernet bus segment 146A.

Elevator system nodes 150A, 150B, 150C, i.e. landing nodes, are connected to a multi-drop Ethernet bus segment 152A, i.e. to a landing segment. Similarly, elevator system nodes 150D, 150E, 150F are connected to a multi-drop Ethernet bus segment 152B, and elevator system nodes 150G, 150H, 150I are connected to a multi-drop Ethernet bus segment 152C. The shaft nodes 148A, 148B, 148C may be configured to act as a switch or a hub, enabling communication between the shaft segment 146 and the respective landing segments 152A, 152B, 152C. Landing nodes that are coupled to the same multi-drop Ethernet bus segment may be configured so that one landing node is to be active at a time while the other landing nodes of the same multi-drop Ethernet bus segment are in a high-impedance state.

In an example embodiment, the landing node 150A, 150B, 150C, 150D, 150E, 150F, 150G, 150H, 150I may be configured to interface with at least one of an elevator fixture, an elevator sensor, an elevator safety device, and an elevator control device. Further, in an example embodiment, power to the nodes may be provided with the same cabling.

Figure 1G:
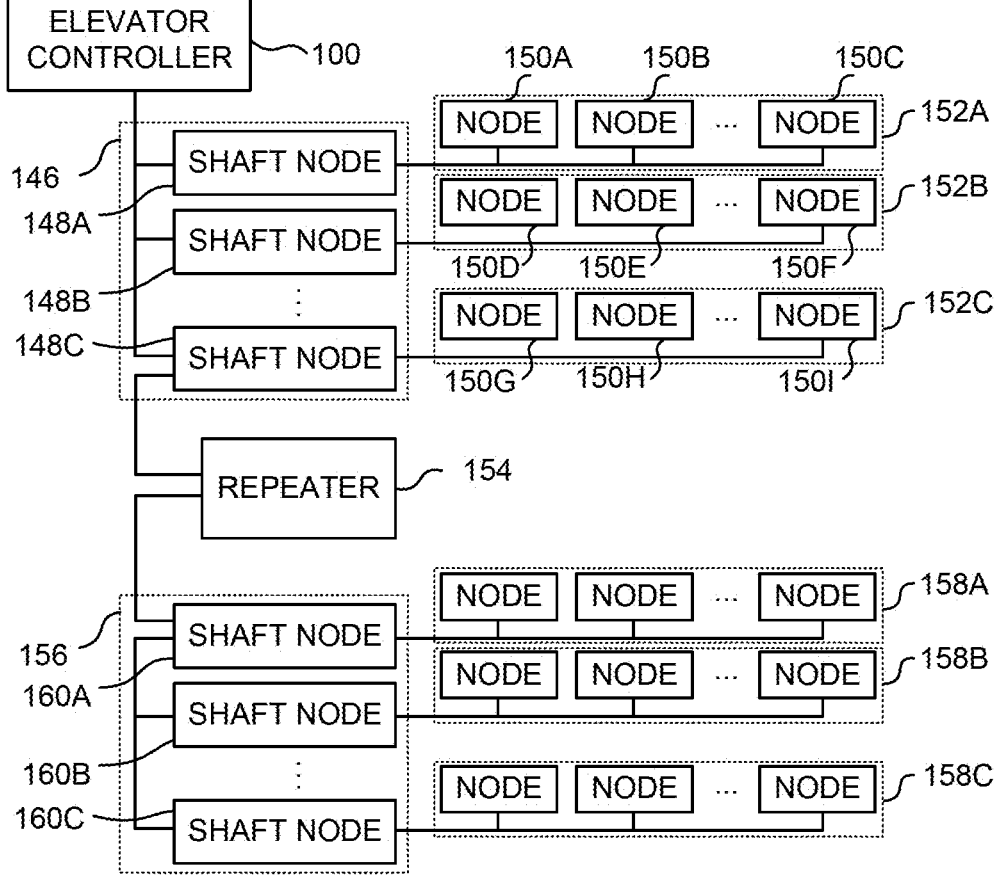
FIG. 1G illustrates an elevator communication system according to another example embodiment.

FIG. 1G illustrates an elevator communication system according to another example embodiment. The embodiment illustrated in FIG. 1G comprises all the elements discussed in relation to FIG. 1E. Additionally, FIG. 1G illustrates a repeater 152 that connects another shaft segment 156 to the shaft segment 146. As illustrated in FIG. 1G, multiple landing segments 158A, 158B, 158C are connected to the shaft nodes 160A, 160B, 160C similarly than was discussed above in relation to FIG. 1F. By using one more repeaters, the physical reach of the multi-drop Ethernet bus segments 146, 156 can be extended.

Figure 1H:
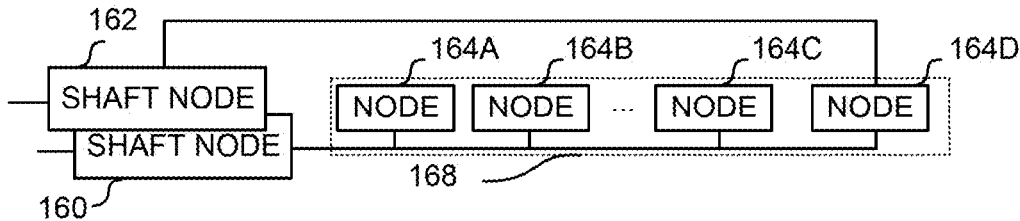
FIG. 1H illustrates a portion of an elevator communication system according to another example embodiment.

FIG. 1H illustrates a portion of an elevator communication system according to another example embodiment. The elevator communication system comprises a shaft node 160 that may be connected to a point-to-point Ethernet bus or to a multi-drop Ethernet bus as has already been discussed above. A landing segment 168, i.e. a multi-drop Ethernet bus segment, is connected to the shaft node 160. The landing segment 168 comprises also a node 164D that can further be connected to a duplicated shaft node 162. This way, for example, a connection error of a landing node 164A, 164B, 164C may be identified and communication may be continued even in case of such a connection error.

Figure 1I:
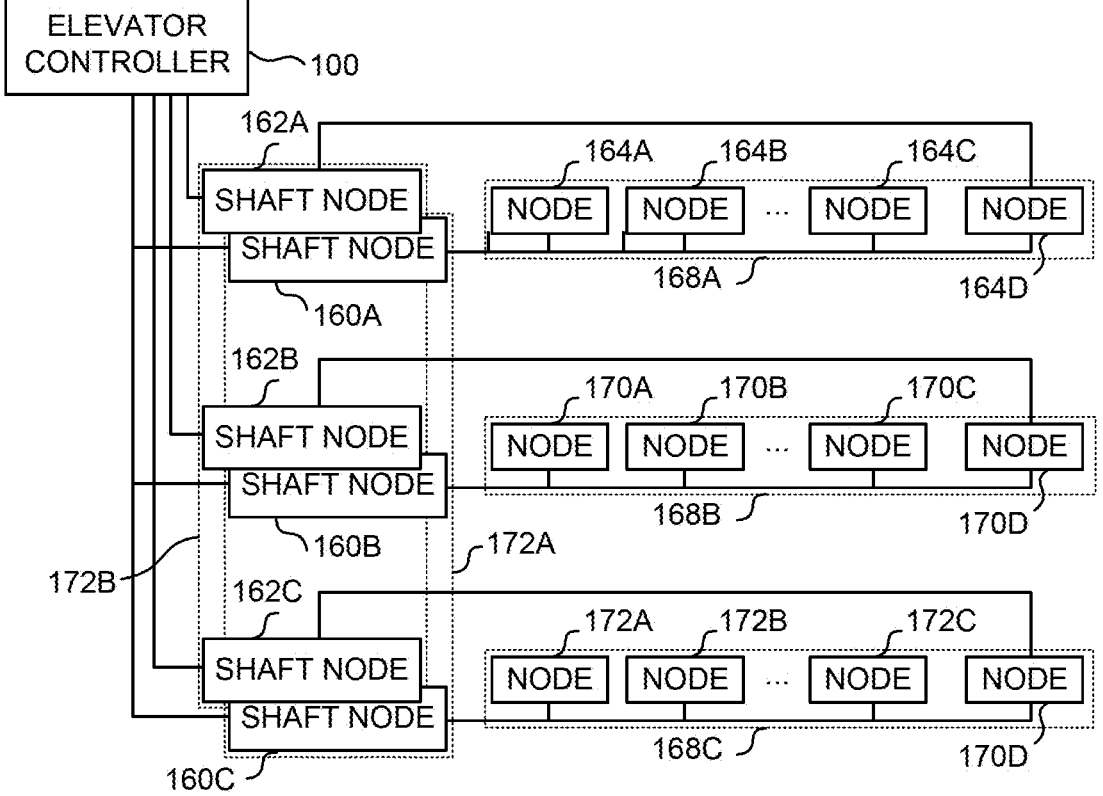
FIG. 1I illustrates a portion of an elevator communication system according to another example embodiment.

FIG. 1I illustrates a portion of elevator communication system according to another example embodiment. Compared to the embodiment of FIG. 1H, in FIG. 1I also the shaft segment has been duplicated.

The elevator communication system comprises shaft nodes 160A, 106B, 106C that may be connected to a point-to-point Ethernet bus or to a multi-drop Ethernet bus as has already been discussed above. Landing segments 168A, 168B, 168C, i.e. multi-drop Ethernet bus segments, are connected to the respective shaft nodes 160A, 160B, 160C. The landing segments 168A, 168B, 168C comprise also nodes 164D, 170D, 172D that can further be connected to duplicated shaft nodes 162A, 162B, 162C, and the connections from the shaft nodes 162A, 162B, 162C to the elevator controller 100 may be separate from the connections from the shaft nodes 160A, 106B, 160C to the elevator controller 100. This way, for example, a connection error of a landing node 164A-164D, 170A-170D, 172A-172D may be identified and communication may be continued even in case of such a connection error. This means that communication via the shaft bus, i.e. the multi-drop Ethernet bus segment, is still possible even if one shaft segment fails.

Figure 2:
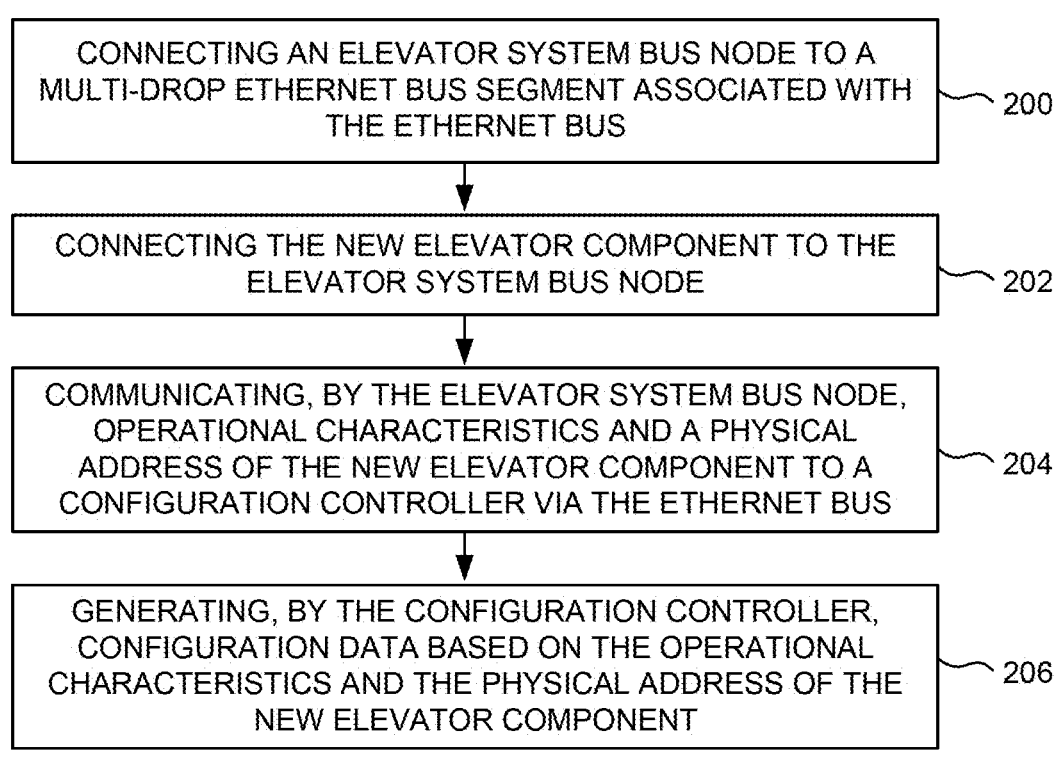
FIG. 2 illustrates a method for introducing a new elevator system component to an elevator control system comprising an Ethernet bus according to an example embodiment.

FIG. 2 illustrates a method for introducing a new elevator system component to an elevator control system comprising an Ethernet bus according to an example embodiment.

At 200, an elevator system bus node is connected to a multi-drop Ethernet bus segment associated with the Ethernet bus. The multi-drop Ethernet bus segment may be one already discussed relating to any of FIGS. 1A-1I.

At 202, the new elevator system component is connected to the elevator system bus node. In other words, the elevator system components connects to the multi-drop Ethernet bus segment via the elevator system bus node.

At 204, operational characteristics and a physical address of the new elevator system component is communicated by the elevator system bus node to a configuration controller via the multi-drop Ethernet bus. The new elevator system component contains information of its features, characteristics and possibilities. This may be communicated to the configuration controller via the multi-drop Ethernet bus node. Control tasks of an elevator controller may be assigned based on these communicated device capabilities. Further, a physical location of the multi-drop Ethernet bus node/connected elevator system components may be solved. Further, when a message is sent from the multi-drop Ethernet bus node to the configuration controller, switches and routers will automatically provide address information such that a network address of the sender (i.e. the elevator system component) will be known when message is received by a receiver.

At 206, configuration data is generated by the configuration controller based on the operational characteristics and the physical address of the new elevator system component. The configuration controller may also configure at least one of elevator controller software and the new elevator system component based on the configuration data. After the configuration, the new elevator system node may be configured to communicate with the configuration controller using the Ethernet protocol.

In an example embodiment, the configuration controller is a remote server or a cloud computing entity. In another example embodiment, the configuration controller is an elevator controller.

In an example embodiment, the new elevator system component may comprise one of a display, a destination call panel, a car call button, a safety contact, a voice intercom system, and a camera.

The illustrated solution may enable a solution in which, when a new elevator system component is added to the control system, it can be configured easily and in a very scalable way.

Figures 3A, 3B:
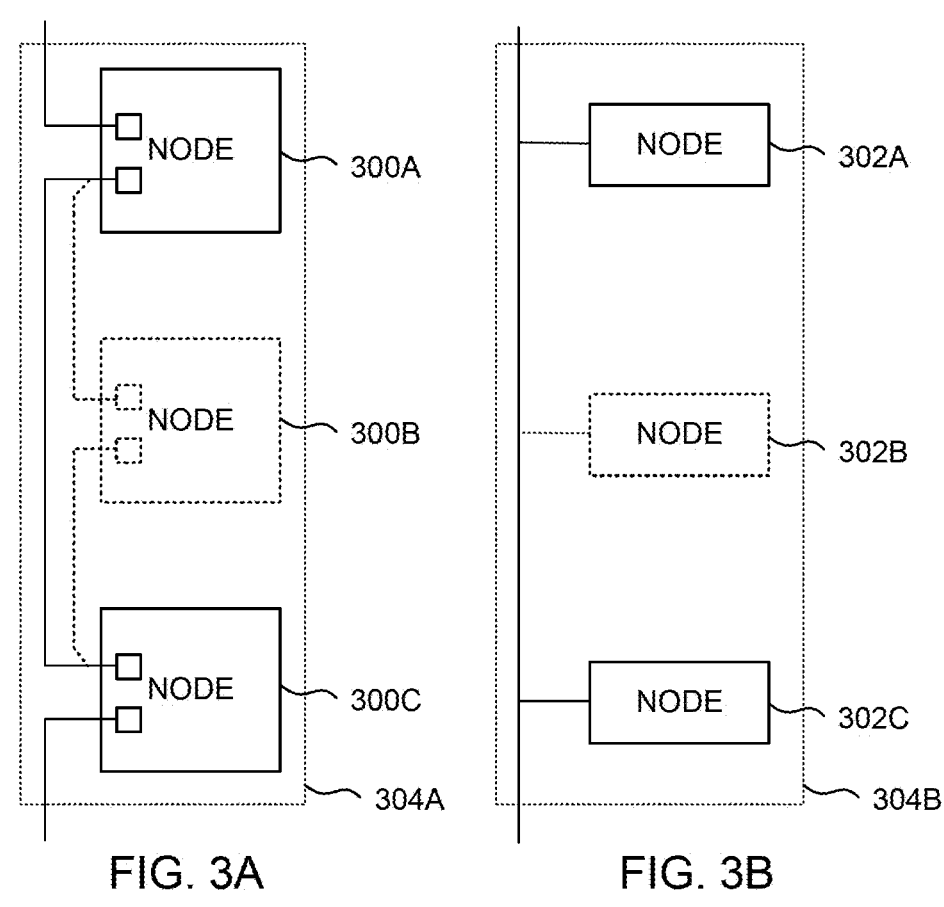
FIGS. 3A and 3B illustrate examples of adding a new elevator system component to an elevator control system according to an example embodiment.

FIGS. 3A and 3B illustrate examples of adding a new elevator system component to an elevator control system according to an example embodiment.

FIG. 3A illustrates an example in which a new elevator system component, for example, a display, a destination call panel, a car call button, a safety contact, a voice intercom system, and a camera, is connected to a multi-drop Ethernet bus segment 304A via a new node 300B. In the simplified example, two nodes 300A, 300C were already connected to the multi-drop Ethernet bus segment 304A. In this example, the physical connection between the node is a two-connector solution such that a first connector of a node is connected to a previous node and a second connector of the node is connected to a subsequent node. The addition of the new node 300B is easy and can be made by placing the new node 300B between two existing nodes 300A, 300C and adjusting the wiring.

FIG. 3B illustrates an example in which a new elevator system component, for example, a display, a destination call panel, a car call button, a safety contact, a voice intercom system, and a camera, is connected to a multi-drop Ethernet bus segment 304B via a new node 302B. The multi-drop Ethernet bus segment 304B is implemented so that it enables an addition of a new node 302B without changing wiring of the already existing nodes 302A, 302C.

At least some of the above discussed example embodiments may enable transmission of any device data seamlessly between elevator system devices and any other device or system. Further, a common protocol stack may be used for all communication. At least some of the above discussed example embodiments may also enable a solution that provides high security and/or is easily expandable. At least some of the above discussed example embodiments may also enable a solution that provides high performance. Further, at least some of the above discussed example embodiments may enable a solution in which the elevator system nodes can communicate with the elevator controller (s) and remote server/cloud using the Ethernet protocol, without a need for any protocol stack conversions. Further, at least some of the above discussed example embodiments may enable, for example, classifying different functional parts of the elevator communication system into separate multi-drop Ethernet bus segments.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator communication system, comprising: an elevator controller;
at least one multi-drop Ethernet bus segment including an elevator car segment installed within an elevator car and reachable by the elevator controller;
at least one point-to-point Ethernet bus including a first point-to-point Ethernet bus within a travelling cable of the elevator car;
at least one network connecting device, the at least one network connecting device including a network connecting device within the elevator car and having a first port connected to the elevator car segment of the at least one multi-drop Ethernet bus segment and a second port connected to the first point-to-point Ethernet bus; and
a plurality of elevator system nodes connected to the at least one multi-drop Ethernet bus segment, the plurality of elevator system nodes configured to communicate via the at least one multi-drop Ethernet bus segment such that the elevator controller is reachable by the plurality of elevator system nodes via the at least one multi-drop Ethernet bus segment.

2. The elevator communication system of claim 1, wherein the at least one point-to-point Ethernet bus further includes a second point-to-point Ethernet bus, and the at least one multi-drop Ethernet bus segment further includes at least one shaft segment connected to a respective one of at least one shaft node among the plurality of elevator system nodes, wherein the at least one network connecting device further comprises: at least one network connecting device associated with the at least one shaft segment comprises a first port connected to the shaft segment and a second port connected to the second point-to-point Ethernet bus.

3. The elevator communication system of claim 2, wherein the at least one multi-drop Ethernet bus segment comprises:
a landing segment connected to a respective one of the at least one shaft node, the at least one shaft node interconnecting the landing segment to another one of the at least one multi-drop Ethernet bus segment to which the at least one shaft node is connected.

4. The elevator communication system of claim 1, wherein the at least one multi-drop Ethernet bus segment comprises:
multiple chained multi-drop Ethernet bus segments forming shaft segments each connected to a respective shaft node among the plurality of elevator system nodes, wherein at least one network connecting device is configured to interconnects two consecutive ones of the shaft segments to extend a reach of the shaft segments.

5. The elevator communication system of claim 1, wherein the at least one multi-drop Ethernet bus segment comprises:
a shaft segment connected to a respective one of at least one shaft node among the plurality of elevator system nodes such that the at least one shaft node is configured to communicate via the shaft segment; and
a landing segment connected to the at least one shaft node.

6. The elevator communication system of claim 5, wherein the at least one shaft node is duplicated.

7. The elevator communication system of claim 6, wherein the at least one duplicated shaft node is connected to another location of the landing segment than the at least one shaft node.

8. The elevator communication system of claim 7, wherein the shaft segment is duplicated, and the duplicated shaft segment is connected to the duplicated shaft node.

9. The elevator communication system of claim 1, further comprising: a point-to-point Ethernet bus reachable via a first port associated with the elevator controller, and wherein the at least one multi-drop Ethernet bus segment is reachable via a second port associated with the elevator controller.

10. The elevator communication system of claim 1, wherein the at least one multi-drop Ethernet bus segment is configured to cover separate functional segments of the elevator communication system.

11. The elevator communication system of claim 10, wherein the separate functional segments include a machinery area segment, a machine room segment, a shaft segment, a landing segment, a pit segment or a car segment.

12. The elevator communication system according to claim 1, further comprising: an elevator safety controller connected to the elevator controller via a point-to-point Ethernet bus and reachable by the at least one multi-drop Ethernet bus segment.

13. The elevator communication system of claim 1, further comprising: an elevator group controller connected to the elevator controller.

14. The elevator communication system of claim 1, further comprising: a network analyzer configured to analyze bus traffic, the network analyzer being communicatively connected to the elevator controller.

15. The elevator communication system of claim 1, further comprising:

a network interface communicatively connected to the elevator controller, the network interface enabling a connection to an external communication network.

16. The elevator communication system of claim 1, wherein the plurality of elevator system nodes are configured to interface with at least one of:

an elevator fixture; an elevator sensor;

an elevator safety device; and an elevator control device.

17. The elevator communication system of claim 1, wherein the plurality of elevator system nodes are each configured to interface with a respective one of a plurality of elevator system components, and wherein the elevator controller and the plurality of elevator system components are configured to utilize a same protocol stack for communication such that the plurality of elevator system components are configured to communicate with the elevator controller without utilizing a gateway.

18. The elevator communication system of claim 17, wherein, only the one of the plurality of elevator system nodes associated with a same one of the at least one multi-drop Ethernet bus segment are an active elevator system node at a same time while a remainder of the plurality of elevator system nodes associated with the same one of the at least one multi-drop Ethernet bus segment are inactive elevator system nodes, wherein the inactive elevator system nodes are inhibited from transmitting interference on the at least one multi-drop Ethernet bus segment by being set to a high independence state.

19. The elevator communication system of claim 1, wherein the plurality of elevator system nodes are configured such that, upon connecting a new elevator system component to a one of the plurality of elevator system nodes, the one of the plurality of elevator system nodes is configured to transmit operational characteristics and a network address of the new elevator system component to a configuration controller via the multi-drop Ethernet bus segment, and wherein the configuration controller is configured to generate configuration data based on the operational characteristics and the network address of the new elevator system component.

20. A method for introducing a new elevator system component to an elevator control system, the method comprising:

connecting the new elevator system component to an elevator system bus node connected to a multi-drop Ethernet bus segment installed within an elevator car and associated with an Ethernet bus included in the elevator control system, the elevator system bus node being one of a plurality of elevator system bus nodes, and the Ethernet bus including at least one point-to-point Ethernet bus including a first point-to-point Ethernet bus within a travelling cable of the elevator car, the elevator system bus node being connected to a first port of a network connecting device within the elevator car and the first point-to-point Ethernet bus being connected to a second port of the network connecting device; and transmitting operational characteristics and a network address of the new elevator system component from the elevator system bus node to a configuration controller via the network connecting device and the Ethernet bus, wherein the configuration controller is configured to generate configuration data based on the operational characteristics and the network address of the new elevator system component.

21. The method of claim 20, further comprising:

configuring at least one of elevator controller software and the new elevator system component based on the configuration data.

22. The method of claim 20, wherein the configuration controller is one of a remote server, a cloud computing entity and an elevator controller.

23. The method of claim 20, where in the elevator system bus node is configured to communicate with the configuration controller using an Ethernet protocol.

24. The method of claim 20, wherein the new elevator system component comprises one of a display, a destination call panel, a car call button, a safety contact, a voice intercom system, and a camera.

25. The method of claim 24, where the new elevator system component is automatically configured to join the elevator control system in response to the connecting the new elevator system component to the elevator system bus node.

26. The method of claim 20, wherein only the elevator system bus node among the plurality of elevator system bus nodes associated with the multi-drop Ethernet bus segment is an active elevator system bus node at a same time while a remainder of the plurality of elevator system bus nodes associated with the multi-drop Ethernet bus segment are inactive elevator system bus nodes, wherein the inactive elevator system bus nodes are inhibited from transmitting interference on the multi-drop Ethernet bus segment by being set to a high independence state.

* * * * *